United States Patent
Schmed

(10) Patent No.: US 6,382,083 B2
(45) Date of Patent: May 7, 2002

(54) COFFEE MACHINE

(75) Inventor: Arthur Schmed, Ober-Dürnten (CH)

(73) Assignee: Fianara International B.V., Amsterdam (NL)

( * ) Notice: Subject to any disclaimer, the term of this patent is extended or adjusted under 35 U.S.C. 154(b) by 0 days.

(21) Appl. No.: 09/795,755

(22) Filed: Feb. 28, 2001

(30) Foreign Application Priority Data

Mar. 15, 2000 (CH) ................................................ 490/00

(51) Int. Cl.⁷ ................................................ A47J 31/06
(52) U.S. Cl. .................... 99/299; 99/283; 99/302 R; 99/389 R
(58) Field of Search ...................... 99/283, 299, 302 R, 99/295, 289 R, 292, 307

(56) References Cited

U.S. PATENT DOCUMENTS 5,628,902 A * 5/1997 Pytlik et al. .......... 99/302 R X
5,669,287 A * 9/1997 Jefferson, Jr. et al. ........ 99/299

FOREIGN PATENT DOCUMENTS

| CH | 668543 | 1/1989 |
|----|--------|--------|
| DE | 3035157 | 4/1982 |
| EP | 0 264 352 | 4/1988 |
| EP | 0 542 045 | 5/1993 |
| EP | 1 016 364 | 7/2000 |
| WO | WO 98/56286 | 12/1998 |

* cited by examiner

Primary Examiner—Reginald L. Alexander
(74) Attorney, Agent, or Firm—Maginot, Moore & Bowman

(57) ABSTRACT

The invention refers to a coffee machine having a brewing chamber and a beverage outlet. A valve assembly is inserted between the brewing chamber and the beverage outlet. The valve assembly comprises a valve seat and a valve body member movable with regard to the valve seat. The valve body member is biased by a spring and can be moved, against the force of the spring, by the pressure of the coffee beverage flowing through the valve assembly. Moreover, these are provided for adjusting the bias force of the spring. In such a design, the operator or user of the coffee machine can directly influence the amount of coffee to be brewed per time unit. Moreover, within the limits of the user selected value, the brewing water flows through the coffee powder received in the brewing chamber with an essentially constant flow rate, regardless the amount and granule size of the coffee powder received in the brewing chamber.

24 Claims, 4 Drawing Sheets

COFFEE MACHINE

BACKGROUND OF THE INVENTION

The present invention refers to a coffee machine, comprising a fresh water supply, for example a water reservoir, a coffee brewing unit provided with a brewing chamber, means for supplying coffee powder to said brewing chamber, a coffee beverage outlet and a pump for conveying water under pressure from the fresh water reservoir through the brewing chamber containing the coffee powder to the coffee beverage outlet.

More specifically, the invention refers to a so-called "Espresso Machine" in which coffee powder contained in a dedicated brewing chamber or in a sieve holder is subjected to hot pressurized water, flowing there through, thus yielding a coffee beverage. In recent espresso coffee machines, meanwhile, there is provided a possibility for the user or operator of the machine to select or adjust the amount of coffee powder to be used for preparing a coffee beverage, as well as to select or adjust the grinding rate of the coffee powder, i.e. the granule size thereof. As a consequence of these possibilities, problems can arise insofar as by varying the above mentioned parameters, the pressure drop in the brewing water flowing through the brewing chamber is influenced as well. It is understood that the pressure drop is increasing the greater the amount of coffee powder is and the finer the coffee beans are ground. In contrast, the pressure drop decreases if the amount of coffee powder in the brewing chamber is decreased and the coffee beans are ground to yield a coarser coffee powder.

Besides these facts, however, the above mentioned pressure drop depends on further parameters that usually cannot be influenced by the user or operator of the coffee machine, for example on the degree of compacting the coffee powder in the brewing chamber. By the above mentioned parameters, it is understood that also the flow rate of the brewing water through the brewing chamber and, thereby, the amount of coffee beverage available at the beverage outlet per time unit is influenced. The result is, depending on the interference of the selected or predetermined parameters, that the coffee beverage flows out of the beverage outlet anyhow between slow and fast without a possibility for the user or operator to control it.

For example, studies performed by the applicant have shown that fundamental differences in habits of the kind of preferred coffee exist between northern countries and southern countries. Generally speaking, in southern countries, a coffee beverage preferably in the form of an "espresso" is preferred, while in northern countries a "standard" coffee or a cappuccino is preferred. These studies have further shown that, in southern countries, an espresso coffee beverage is considered to be of high quality if the coffee beverage flows into the cup but very slowly, while a quick preparation of a standard coffee is preferred in northern countries, since the amount of coffee to be prepared in the case of a standard coffee is much higher than the one in the case of an espresso coffee. It is understood that the dwell time of the brewing water in the brewing chamber is longer if the flow rate, i.e. the amount of brewing water flowing through the brewing chamber per time unit, is low than is the case of a high flow rate; thus, selecting a low flow rate results in a more effective extraction of the coffee powder. Thereby, it can also be explained why the flow rate has an influence on the taste of the prepared coffee beverage. However, the flow rate of the brewing water flowing through the compacted coffee powder received in the brewing chamber can be influenced only indirectly by the user or operator of a coffee machine known in the art, for example by adjusting the degree of grinding of the coffee beans and the granule size of the coffee powder, respectively.

PRIOR ART

Known in the prior art are coffee machines comprising a valve assembly with a design to increase the pressure in the brewing chamber, resulting in the fact that a foam is created appearing on the top surface of the coffee beverage dispensed into a coffee cup. However, such known valve assemblies, as far as the flow rate of the brewing water flowing through the compacted coffee powder received in the brewing chamber is concerned, have only an effect insofar as they increase the back pressure in the brewing chamber and, thereby, decrease the flow rate of the brewing water in any case.

Such a valve assembly is disclosed, for example in the document DE 30 35 157. In that document, a brewing head for an espresso coffee machine is described which is provided with a sieve insert for receiving the coffee powder. At the outlet of that sieve insert, a spring biased check valve is provided by means of which the pressure in the brewing head is increased to such an extent that a foaming coffee beverage is dispensed.

Moreover, the document EP 0 542 045 discloses a coffee brewing device in which a valve is located at the outlet of the brewing chamber. The valve body member thereof is biased against the flow direction of the coffee beverage. The valve body member can be moved, against the force of the bias spring, under the influence of the coffee beverage escaping from the brewing chamber. Again, with that design, a back pressure in the region of appr. 1 bar shall be created for providing a coffee beverage having a durable foam on its top.

The document CH 668 543 discloses an espresso coffee machine of the kind referred to herein, having a spring-biased ball valve located at the outlet of the brewing chamber. Again, by means of that ball valve, a coffee beverage having a durable foam on its top shall be created.

Finally, the document EP 0 726 053 discloses an apparatus for dispensing a coffee beverage, having a filter container for receiving the coffee powder and an outlet channel connected to that filter container and comprising a check valve member. That check valve member comprises a valve body member kept in contact with a valve seat by an elastic means. Between the valve body member and the valve seat, a closed gap is formed in which the solid particles released from the coffee powder can collect in order to form a plug. As soon as a predetermined pressure is reached in the filter container, the valve body member is moved against the spring force of the elastic means, with the result that the gap between the valve seat and the valve body member is increased and opens towards the bottom. Thus, the plug is released and the extract liquid can flow out downwards. By virtue of this design, a complete extraction of the coffee powder shall be ensured.

OBJECTS OF THE INVENTION

Thus, on the basis of the afore mentioned prior art, it is an object of the present invention to provide a coffee machine in which the user or operator can directly influence the amount of coffee beverage to be brewed per time unit.

It is a further object of the present invention to provide a coffee machine in which the brewing water flows through the coffee powder received in the brewing chamber with an essentially constant flow rate, independent of the amount of coffee powder received in the brewing chamber and the granule size thereof.

SUMMARY OF THE INVENTION

To meet these and other objects, the invention provides a coffee machine, comprising a fresh water supply, for example a water reservoir, a coffee brewing unit provided with a brewing chamber, means for supplying coffee powder to the brewing chamber, and a coffee beverage outlet. Further, a pump is provided for conveying water under pressure from the fresh water supply through the brewing chamber containing the coffee powder to the coffee beverage outlet. A valve assembly is inserted between the brewing chamber and the coffee beverage outlet whereby the valve assembly comprises means for adjusting the amount of coffee beverage flowing through the valve assembly per time unit.

Preferably, the valve assembly comprises a valve chamber and a valve body member movable in the valve chamber from an open position in which the coffee beverage can flow through the valve assembly to a closed position in which the flow of the coffee beverage through the valve assembly is blocked. Moreover, a spring acting on the valve body member is provided to bias the valve body member to move into the open position. The valve body member has a surface exposed to the coffee beverage flowing into the valve assembly, whereby the valve body member is adapted to be moved, against the biasing force exerted by the spring, into the closed position when the afore mentioned surface is charged by the pressure of the coffee beverage.

By the provision of means for adjusting the amount of coffee beverage flowing through the brewing chamber per time unit, the user or operator of the coffee machine can directly influence the flow rate of the brewing water flowing through the coffee powder contained in the brewing chamber and, thereby, the amount of coffee brewed per time unit. Since the valve assembly is designed as a regulating valve in which the spring is set to keep the valve body member in the open position, and since the valve body member can be moved under the influence of the coffee beverage flowing through the valve, against the force of the spring, towards the closed position, also the relative flow rate can be kept constant within certain limits. It is understood that the flow rate of the brewing water flowing through the coffee powder cannot be kept on an absolutely exact constant level by means of a valve assembly of the kind referred to herein, since the regulation behavior of the valve assembly depends, amongst else, on the viscosity of the liquid flowing there through. Thus, a varying viscosity of the coffee beverage flowing out of the brewing chamber can have, to a certain extent, an effect on the flow velocity of the brewing water flowing through the coffee powder contained in the brewing chamber.

BRIEF DESCRIPTION OF THE DRAWINGS

In the following, some embodiments of the coffee machine according to the invention will be further described, with reference to the accompanying drawings, in which.

DETAILED DESCRIPTION OF THE PREFERRED EMBODIMENTS

Figure 1:
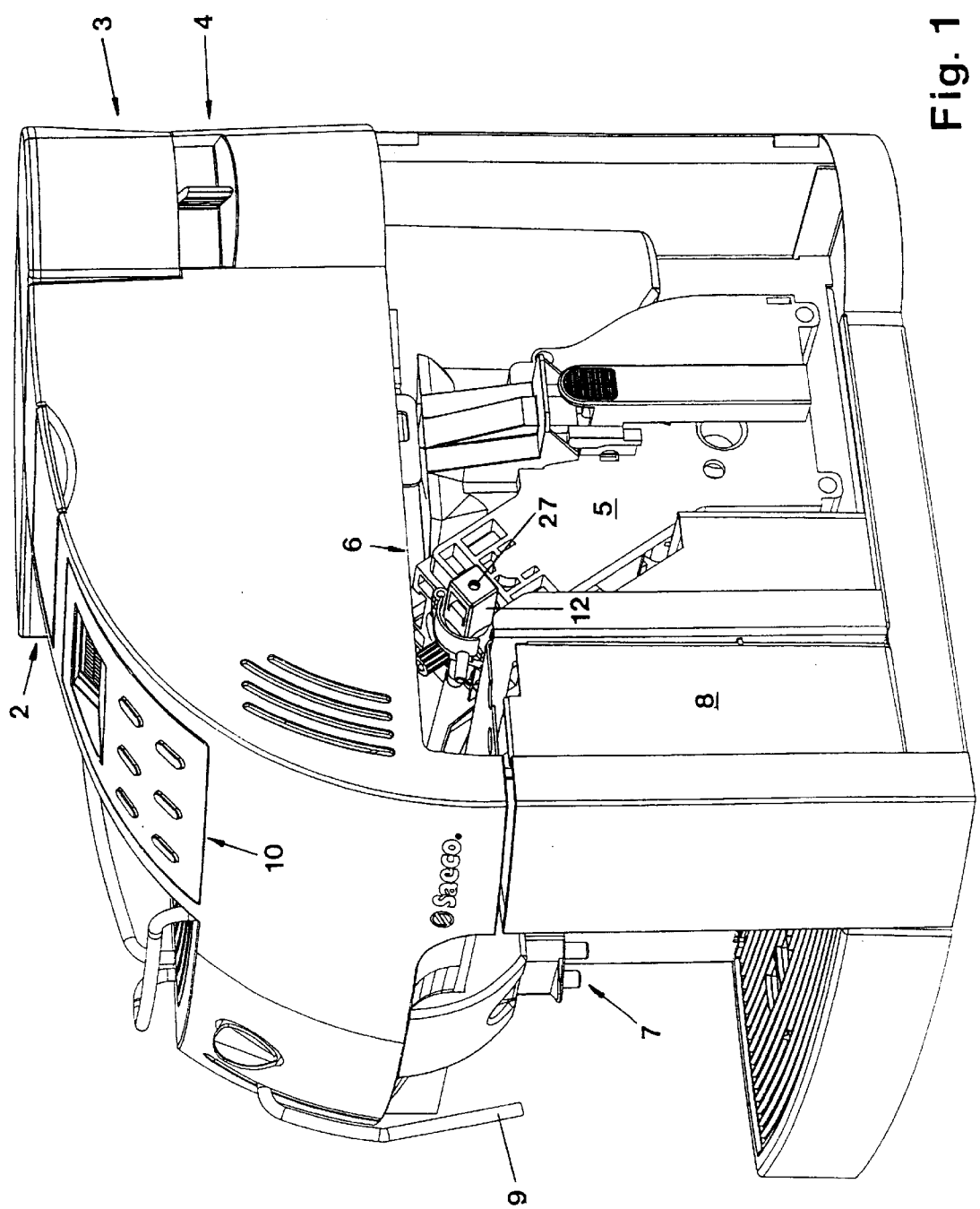
FIG. 1 shows a schematically illustrated coffee machine equipped with a valve assembly for adjusting the amount of coffee beverage supplied per time unit.

FIG. 1 shows an embodiment of a coffee machine according to the invention in a simplified overall perspective view. Coffee machines of the kind referred to herein fundamentally comprise a fresh water reservoir 2, a compartment 3 for receiving fresh coffee beans, a coffee bean grinding device 4, a brewing unit 5 provided with a brewing chamber 6, an outlet 7 for the final coffee beverage, a recipient 8 for receiving coffee grounds, an outlet 9 for hot water or steam as well as an operating and control unit 10. It is understood that also a pump required for supplying water to the brewing chamber is provided; however, that pump is not shown in FIG. 1.

The brewing chamber 6 located in the brewing unit 5 serves for receiving the coffee powder to be brewed, whereby the coffee powder is compressed by means of a not shown movable piston member prior to the real brewing operation and, thereafter, pressurized hot water is forced to flow through the compressed coffee powder. It is understood that the compressed coffee powder provides a certain resistance to the hot water, having an initial inherent pressure of between 8 and 12 bar, flowing through the compressed coffee powder, with the result that the pressure of the water leaving the compressed coffee powder has a reduced pressure. Such reduction in pressure is influenced particularly by the compacting degree of the coffee powder, by the amount of the coffee powder and by its granule size. Since these parameters can be controlled by the operator or user of the coffee machine only to a certain extent, up to now, the operator or user hardly could influence the amount of coffee beverage supplied by the coffee machine per time unit.

According to the present embodiment of the coffee machine of the invention, there is provided a valve assembly 12 located between the brewing unit 5 and the beverage outlet 7. Now, for the first time, the amount of coffee beverage flowing through the system and, thereby, the amount of coffee beverage flowing out of the outlet 7 per time unit can be adjusted by the operator or user. For this purpose, the valve assembly 12 is provided with an adjustment screw member 27.

Figure 2:
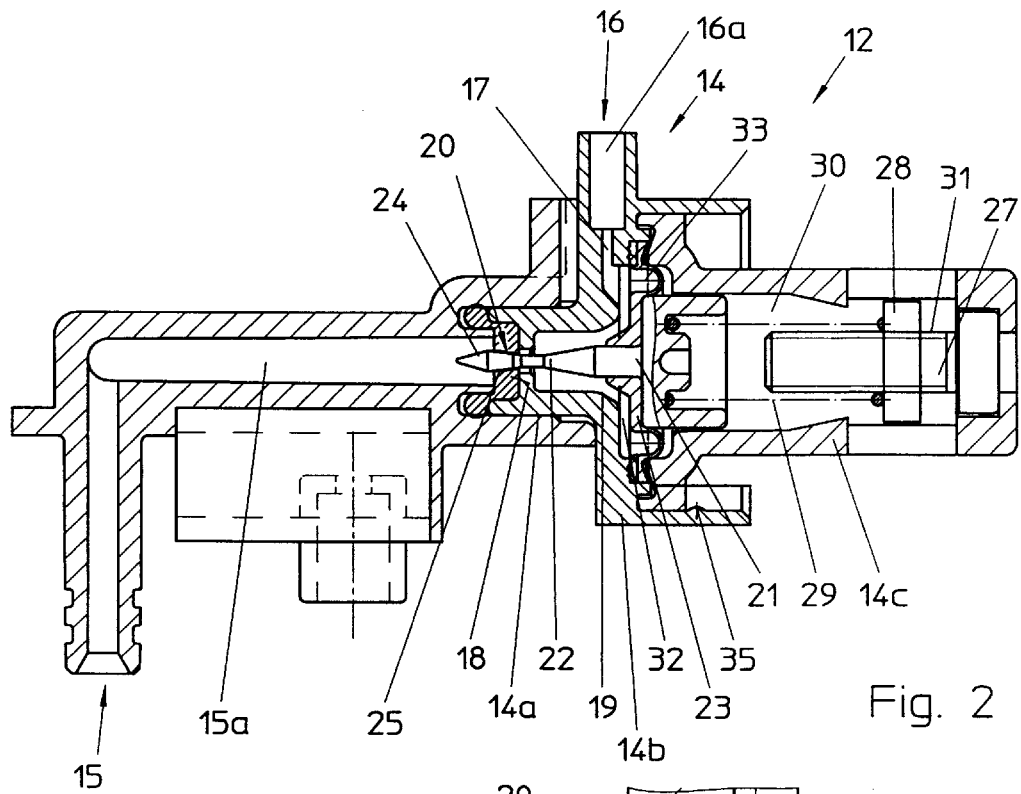
FIG. 2 shows a longitudinal sectional view of a first embodiment of a valve assembly in the position "normal coffee"

FIG. 2 shows a longitudinal sectional view of a first embodiment of the valve assembly 12 in a first position thereof particularly suitable for preparing so-called "normal" or "standard" coffee. The valve assembly 12 comprises a valve housing 14 consisting of several housing portions 14a, 14b and 14c and having an inlet 15 as well as an outlet 16. The inlet 15 is provided with an inlet channel 15a and the outlet 16 is provided with an outlet channel 16a. The inlet 15 of the valve assembly 12 is connected to the outlet of the brewing chamber (not shown in FIG. 2). Thus, the freshly brewed coffee beverage can flow through the inlet channel 15a into the valve assembly 12. The outlet 16 of the valve assembly 12 is connected to the beverage outlet (not shown in FIG. 2) of the coffee machine. In other words, the brewed coffee beverage flows from the outlet channel 16a via a not shown pipe member to the beverage outlet 7 (FIG. 1).

Located in the inlet channel 15a is an insert 18 made of an elastic material and constituting a valve seat member. Behind that insert 18, the inlet channel 15a opens into a valve chamber 19. The valve chamber 19 is connected to the outlet channel 16a through a bore 17 having a well-defined, predetermined cross sectional area. In the valve housing 14, a movable valve body member 21 is received, having a head portion 24 provided with a conically shaped control surface portion 25. The head portion 24 extends through the insert 18. Moreover, the valve body member 21 is provided with a base portion 23 that is exposed to the pressurized coffee beverage flowing through the valve assembly 12. Since the insert 18 is made of an elastic material, it can be slid over the head portion 24 of the valve body member 21 during the assembly of the valve assembly 12. The afore mentioned adjustment screw 27 is located in the back portion of the valve housing 14 and provided with a nut 28. A spring 29 received in a posterior chamber 30 of the valve assembly 12 and serving for biasing the valve body member 21 is supported by that nut 28. For the purpose of sealing the posterior chamber 30, a diaphragm 32 is provided and fixed between two adjacent valve housing portions 14b, 14c. For fixing the one valve housing portion 14b to the other valve housing portion 14c, a snap-on mechanism comprising a plurality of snap elements 35 is provided. The diaphragm 32 comprises an annular recess 33; in the region of that recess 33, the diaphragm has only a reduced thickness such that a good flexibility of the diaphragm 32 is ensured. Moreover, the diaphragm comprises a central opening through which the shaft 22 of the valve body member 21 extends.

Figure 2A:
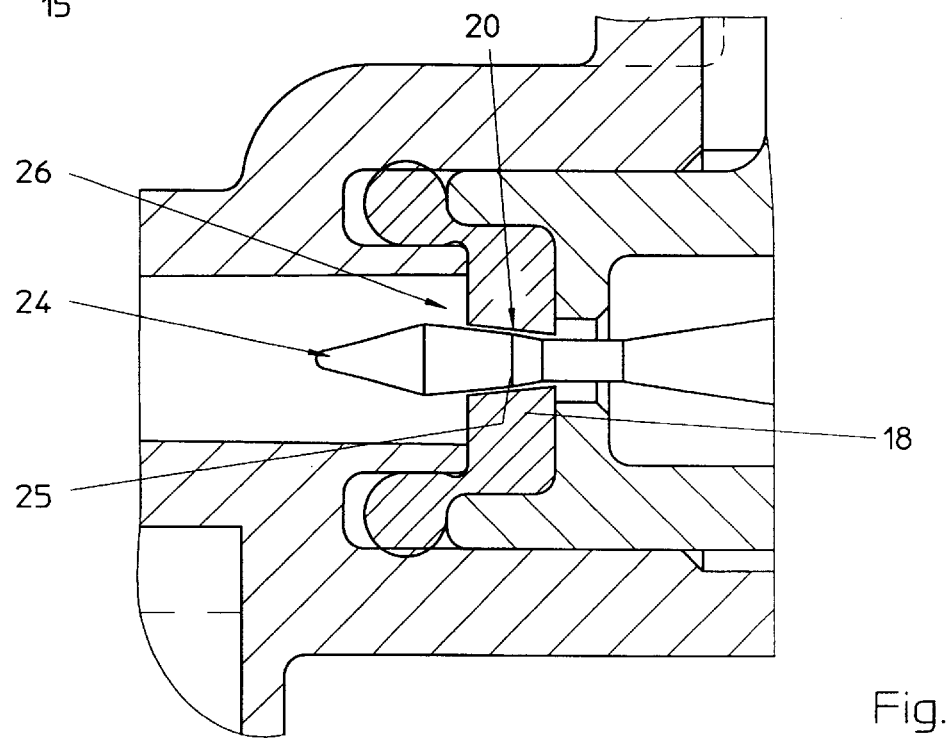
FIG. 2a shows an enlarged portion of FIG. 2.

FIG. 2a shows a partial cross sectional view of the front portion of the valve assembly 12, enlarged as compared to the view of FIG. 2. As can be seen in FIG. 2a, the insert 18 is provided with a valve seat 20 of conical shape, decreasing in diameter as seen in the flow direction of the coffee beverage (i.e. from the left to the right in FIG. 2a), whereby the head portion 24 of the valve body member 21 comprises a conically shaped control surface portion 25 corresponding to the shape of the valve seat 20. In a non-pressurized state of the valve assembly 12, the valve body member 21 is in its left side end position, namely under the influence of the spring 29 (FIG. 2), with the result that a passage 26 is present between the valve seat 20 and the conical control surface portion 25 of the head portion 24 through which the coffee beverage can flow from the inlet channel 15a into the valve chamber 19.

In the following, the operation of the valve assembly 12 will be further explained, with reference to FIGS. 2 and 2a. Upon activation of a (not shown) pump, the brewing water flows through the compressed coffee powder received in the brewing chamber. Therefrom, the so prepared coffee beverage gets into the inlet channel 15a and further, through the passage 26 between the valve seat 20 and the conical portion 25 of the head portion 24 into the valve chamber 19. The coffee beverage once being in the valve chamber 19, an over-pressure is created therein whereby the value of the pressure depends on the amount of coffee beverage entering the valve chamber 19 per time unit. This over-pressure acts, via the diaphragm 32, on the base portion 23 of the valve body member 21 and exerts a force onto the valve body member that is directed opposite to the bias force exerted by the spring 29.

As soon as the force exerted by the pressurized coffee beverage on the valve body member 21 is greater than the bias force of the spring 29 (whereby possible frictional losses are not considered here), the valve body member 21 is moved to the right, as seen in FIGS. 2 and 2a. By such movement to the right, the cross sectional area of the passage 26 between valve seat 20 and the conical surface 25 of the head portion 24 available for the coffee beverage to flow through is continuously decreased.

Due to the fact that the area of the base portion 23 of the valve body member 21 subjected to the coffee beverage is relatively large, a comparatively low over-pressure in the valve chamber 19 is sufficient to move the valve body member 21 further to the right. Thereby, the cross sectional area of the passage 26 between the valve seat 20 and the conical portion 25 of the head portion 24 is decreased again, with the result that the over-pressure in the valve chamber 19 is decreased as well, since the coffee beverage may escape through the bore 17 into the outlet channel 16a.

This design of the valve assembly 12 corresponds to a mechanical control valve that controls the flow rate in dependence of the bias force of the spring. In the embodiment shown in FIG. 2, the bias force of the spring is comparatively large, with the result that a comparatively high over-pressure has to be established in the valve chamber 19 to move the valve head portion 24 to the right by a certain amount. Consequently, the coffee beverage flows through the valve assembly with a high flow rate. Thus, this adjustment of the valve assembly 12 is suitable for preparing so-called "normal" or "standard" coffee.

Figure 3:
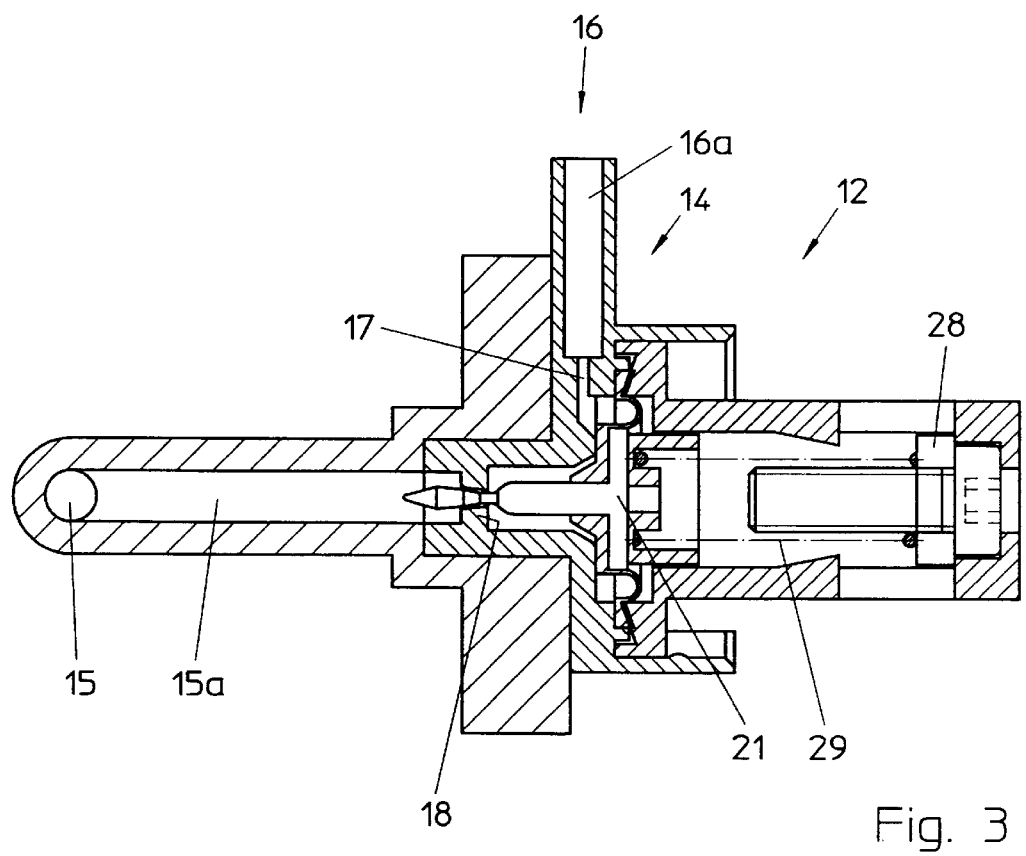
FIG. 3 shows a longitudinal sectional view of the valve assembly of FIG. 2 in the position "espresso coffee"

In the state of the valve assembly 12 shown in FIG. 3, the nut 28 is moved to a position more to the right, as compared to FIG. 2. Thus, the spring 29 is biased with a lower force. Consequently, only a lower over-pressure is required, as compared to the situation shown in FIG. 2, to move the valve body member 21 to the right and, thereby, to decrease the cross sectional area of the passage 26 between the valve seat 20 and the conical portion 25 of the head portion 24. Thereby, an earlier decrease of the size of the passage 26 at the valve seat 20 is caused, resulting in a lower flow rate of the coffee beverage through the valve assembly 12. Consequently, also the brewing water flows relatively slowly through the coffee powder received in the brewing chamber, resulting in a stronger coffee beverage. Thus, this pre-adjustment of the valve assembly is particularly suitable for preparing a so-called "espresso" coffee.

Preferably, the adjustment screw 27 is provided with a thread 31 having a large pitch, such that for example a rotation by only 300° is required to change the position of the nut 28 from the position "standard coffee" of FIG. 2 to the position "espresso coffee" of FIG. 3. However, preferably, a further intermediate position could be provided for preparing a moderate strong coffee, or it is possible to provide for a continuous adjustment.

By virtue of the design of the valve assembly 12 as herein before described and of the control behavior resulting therefrom, it can be ensured that the brewing water flows through the coffee powder received in the brewing chamber with a relative constant flow velocity. Thereby, the absolute flow rate is predominantly determined by the adjustment of the valve assembly 12. As a consequence of the control behavior of the valve assembly 12, the earlier mentioned parameters as compacting rate, amount and granule size of the coffee powder have but a minor effect on the flow rate of the brewing water through the coffee powder. In the case of coarsely ground coffee powder, the brewing water flowing there through is subjected only to a relatively small resistance, resulting in a low pressure drop; consequently, the water having passed the brewing chamber still has a relatively high inherent pressure. In contrast thereto, in the case of finely ground coffee powder, the brewing water flowing there through is subjected to a considerably high resistance, resulting in a higher pressure drop; consequently, the water having passed the brewing chamber has a relatively low inherent pressure. By virtue of the resulting control behavior of the valve assembly 12, i.e. quick response and decreasing the size of the passage 26 between the valve seat 20 and the conical portion 25 of the head portion 24 at high pressure, slow response and decreasing the size of the passage 26 between the valve seat 20 and the conical portion 25 of the head portion 24 at lower pressure, the afore mentioned parameters of the coffee powder received in the brewing chamber have but a small influence on the flow rate of the brewing water through the compressed coffee powder. Thereby, not only a good reproducibility of the quality of the desired coffee beverage is ensured, but the further advantage results that the coffee grinding device does not have to be provided with an adjustment mechanism for adjusting the grinding rate of the coffee beans within relatively wide limits; thus, the operation of the coffee machine is simplified.

It is understood that the coffee machine itself can be provided with an adjustment means, for example a rotary knob, by means of which the adjustment screw 27 can be manually rotated into the desired position. However, instead of a manually operated adjustment, for example also a motorized and, if appropriate, electronically controlled adjustment of the adjustment screw 27 could be provided. For instance, the coffee machine could be provided with a number of keys to be pressed by the operator to select a "standard", a moderately strong or a strong "espresso" coffee. Such keys would be coupled to an electronic adjustment means for adjusting the position of the adjustment screw 27 in response to the pressed key.

Figure 4:
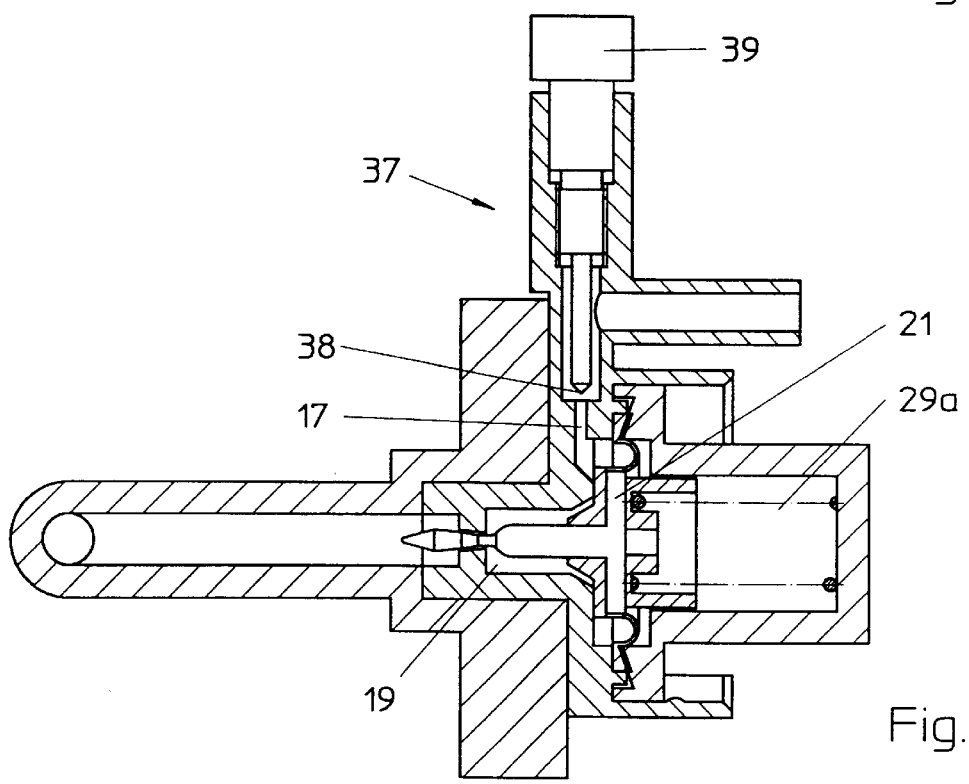
FIG. 4 shows a longitudinal sectional view of an alternative embodiment of a valve assembly.

FIG. 4 shows a cross sectional view of an alternative embodiment of the valve assembly. In this embodiment, the bias force of the spring 29a biasing the valve body member 21 is not adjustable. In order to be nevertheless in a position to vary the volume of the beverage flowing out of the beverage outlet per time unit, a needle valve 37 is provided, connected to an adjustment screw 39 and located in the end region of the bore 17 connected to the valve chamber 19. By rotating the adjustment screw 39, the needle tip 38 of the needle valve 37 is moved in axial direction such that the cross sectional area of the outlet of the valve chamber 19 and of the bore 17 connected to the valve chamber 19, respectively, determining the flow rate, can be adjusted. In this case, the spring biased valve body member 21 primarily serves for the purpose of keeping constant the flow rate of the coffee beverage flowing through the valve assembly 12.

Figure 5:
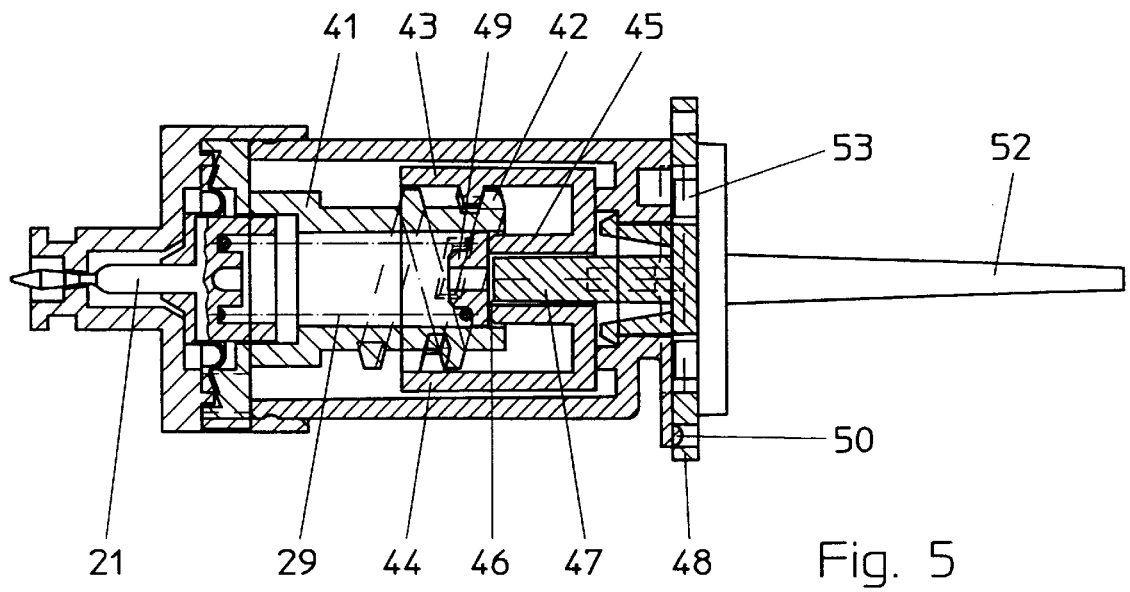
FIG. 5 shows a longitudinal sectional view of a valve assembly having an alternative embodiment of the adjustment mechanism.

FIG. 5 shows a cross sectional view of still another embodiment of a valve assembly, having a different design of the adjustment mechanism. Fundamentally, the valve assembly is similarly constructed as the one shown in FIG. 2, whereby the back portion 41 of the housing is provided with an external thread 42. For varying the bias of the spring 29, a sliding member 43 is provided. The inner side of the sliding member 43 comprises an internal thread 44, engaging the external thread 42 of the back portion 41 of the housing. The sliding member 43 has a cylindrical protrusion 45 for supporting the spring 29 provided for biasing the valve body member 21 via a spring plate member 49. The protrusion 45 includes an opening 46 having hexagonal cross section and receiving a correspondingly shaped shaft 47 of an adjustment disc member 48. For the operation of that assembly, i.e. for moving the sliding member 43, a rotary knob 52 is provided, having cam members 53 at its front side that engage corresponding openings in the adjustment disc member 48. Thus, a rotation of the knob 52 is transferred to the sliding member 43 by means of the adjustment disc member 48. The reference numeral 50 designates indexing elements, the function of which will be described in connection with FIG. 6 herein after.

Figure 6:
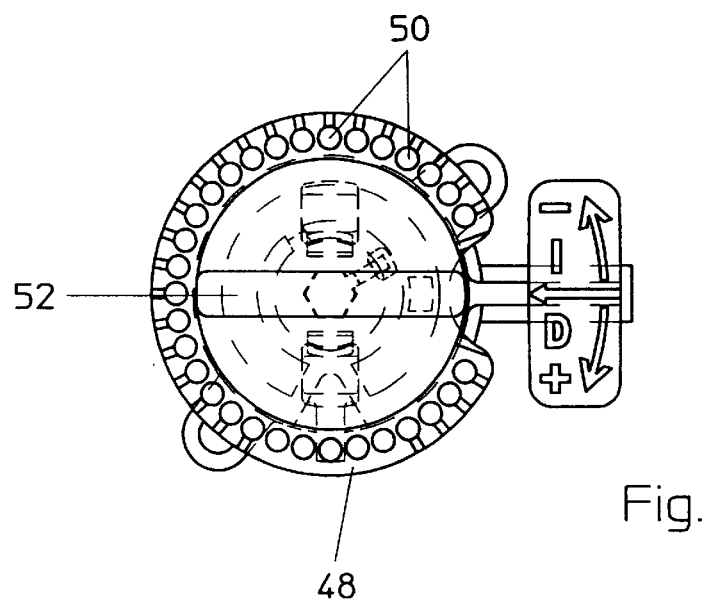
FIG. 6 shows a top view of the valve assembly of FIG. 5.

FIG. 6 shows a top view of the valve assembly according to FIG. 5. In this view, it can be seen that a plurality of indexing elements 50 are provided. On the one hand, these indexing elements 50 provide for an indexing of the rotational movement of the knob 52, and on the other hand, they ensure that the adjustment disc member 48 as well as the sliding member 43 keep their selected positions, thereby avoiding an unintentional variation in spring bias force.

It is understood that the valve assembly herein before described can be used not only in connection with a fully automatically operated coffee machine, but also in a conventional manual espresso machine having a manually insertable sieve holder. In this case, the valve assembly is located preferably between the sieve holder and the beverage outlet of the coffee machine.

What is claimed is:

1. A coffee machine, comprising:
   a fresh water supply means;
   a coffee brewing unit means provided with a brewing chamber means;
   means for supplying coffee powder to said brewing chamber means;
   a coffee beverage outlet means;
   a pump means for conveying water under pressure from said fresh water supply means through said brewing chamber means containing said coffee powder to said coffee beverage outlet means; and
   a valve means inserted between said brewing chamber means and said coffee beverage outlet means, said valve means comprising means for adjusting the amount of coffee beverage flowing through said valve means per time unit.

2. A coffee machine according to claim 1 in which said valve means comprises:
   a valve chamber means and a valve body member means movable in said valve chamber means from an open position in which said coffee beverage means can flow through said valve means to a closed position in which the flow of said coffee beverage means through said valve means is blocked; and
   a spring means acting on said valve body member means to bias said valve body member means to move into said open position, said valve body member means having surface means exposed to said coffee beverage means flowing into said valve means;
   said valve body member means being adapted to be moved, against said biasing force exerted by said spring means, into said closed position when said surface means are charged by the pressure of said coffee beverage.

3. A coffee machine according to claim 2 in which said valve means comprises means for adjusting the bias force exerted by said spring means on said valve body member means.

4. A coffee machine according to claim 2 in which said valve chamber means of said valve means comprises:
   an inlet means and an outlet means;
   a valve seat means cooperating with said valve body member means and located at said inlet means; and
   means for varying the flow cross sectional area of said inlet means and/or said outlet means.

5. A coffee machine according to claim 2 in which said outlet means comprises a bore means having a predetermined cross sectional area, and in which said valve body member means comprises a base portion, said base portion being provided with said surface means exposed to said coffee beverage means flowing into said valve means.

6. A coffee machine according to claim 2 in which said valve body member means comprises a shaft member means and a head portion means located at the free end of said shaft member means, said head portion means being provided with a control surface means facing said valve seat means and having a shape essentially corresponding to the shape of said valve seat means.

7. A coffee machine according to claim 2 in which said valve seat means comprises a central opening of conical shape.

8. A coffee machine according to claim 2 in which said valve body member means is of a one-piece construction, and in which said valve seat means is constituted by an insert member means made of an elastic material.

9. A coffee machine according to claim 2 in which a passage is provided between said control surface means of said valve body member means and said valve seat means when said valve body member means is in said spring biased open position.

10. A coffee machine according to claim 2 in which said valve body member means is movable, opposite to the bias force exerted by said spring means, to such an extent that said control surface means of said valve body member means closes said opening provided in said valve seat means.

11. A coffee machine according to claim 2 in which said biasing force exerted by said spring means is manually adjustable or adjustable by an electric motor means, by an electromagnet means, by a pneumatic means or by a hydraulic means.

12. A coffee machine according to claim 4 in which said means for varying the flow cross sectional area of said inlet means and/or said outlet means are manually operable or operable by an electric motor means, by an electromagnet means, by a pneumatic means or by a hydraulic means.

13. A coffee machine according to claim 5 in which the outlet end of said bore means having a predetermined cross sectional area is provided with a needle valve means for varying the flow cross section of said valve chamber means.

14. A coffee machine according to claim 1 in which said means for adjusting the amount of coffee beverage flowing through said valve means per time unit includes an adjustment screw means or a rotary adjustment knob means.

15. A coffee machine according to claim 3 in which said means for adjusting the bias force exerted by said spring means on said valve body member means include an adjustment screw means or a rotary adjustment knob means.

16. A coffee machine according to claim 14, further comprising means for keeping said rotary adjustment knob means in a selected position.

17. A coffee machine according to claim 2 in which said valve means comprises a posterior chamber means, whereby said base portion of said valve body member means is provided at its side facing said posterior chamber means with a recess means for receiving and supporting said spring means.

18. A coffee machine according to claim 17 in which said valve means further comprises a diaphragm means for sealing said valve chamber means from said posterior chamber means.

19. A coffee machine according to claim 6 in which said diaphragm means comprises a central aperture means through which said shaft member means extends.

20. A coffee machine according to claim 2 in which said valve means comprises a housing means consisting of several housing portions, said diaphragm means being fixed between two of said several housing portions.

21. A coffee machine according to claim 1, comprising means for automatically adjusting the amount of coffee beverage flowing through said valve means per time unit in dependence on the kind of coffee beverage to be prepared.

22. A coffee machine according to claim 3, comprising means for adjusting the bias force exerted by said spring means on said valve body member means in dependence on the kind of coffee beverage to be prepared.

23. A valve assembly for a coffee machine according to claim 1, comprising:

means for adjusting the amount of coffee beverage flowing through said valve assembly per time unit, whereby said valve assembly comprises a valve means designed as a mechanically operating regulating valve having a spring biased valve body member means, said valve body member means being kept in an open position by said spring bias force and being movable to its closed position, opposite to the spring bias force, under the influence of the pressurized coffee beverage flowing there through.

24. A coffee machine, comprising:

a brewing water supply means;

a coffee brewing unit means provided with a brewing chamber means;

means for supplying coffee powder to said brewing chamber means;

a coffee beverage outlet means;

a pump means for conveying brewing water under pressure from said brewing water supply means through said brewing chamber means containing said coffee powder to said coffee beverage outlet means; and a valve means inserted between said brewing chamber means and said coffee beverage outlet means, said valve means being designed as a mechanically operating regulating valve having a flow passage with a variable cross sectional area, said valve means comprising means for adjusting the cross sectional area of said flow passage in response to the flow resistance presented to the brewing water flowing through said brewing chamber by the coffee powder contained in said brewing chamber such that the flow rate of the brewing water flowing through said coffee powder contained in said brewing chamber is kept essentially constant.

* * * * *